United States Patent
Wicks (10) Patent No.: US 10,161,354 B2
(45) Date of Patent: Dec. 25, 2018

(54) COMPOSITE COMBUSTION ENGINE

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 15/213,017

(22) Filed: Jul. 18, 2016

(65) Prior Publication Data

US 2018/0017015 A1    Jan. 18, 2018

(51) Int. Cl.
| | |
|---|---|
| *F02F 1/00* | (2006.01) |
| *F02F 7/00* | (2006.01) |
| *B29C 45/14* | (2006.01) |
| *B29K 307/04* | (2006.01) |
| *B29K 705/02* | (2006.01) |
| *B29K 709/04* | (2006.01) |

(52) U.S. Cl.
CPC ...... *F02F 7/0085* (2013.01); *B29C 45/14065* (2013.01); *F02F 1/004* (2013.01); *B29K 2277/10* (2013.01); *B29K 2307/04* (2013.01); *B29K 2705/02* (2013.01); *B29K 2709/04* (2013.01)

(58) Field of Classification Search
CPC ... F02F 7/0085; F02F 1/004; B29C 45/14065; B29K 2307/04; B29K 2277/10; B29K 2705/02
USPC ................. 123/193.1, 193.3, 29; 29/888.061
See application file for complete search history.

(56) References Cited

U.S. PATENT DOCUMENTS

| | | | | |
|---|---|---|---|---|
| 4,305,348 A | * | 12/1981 | Martin | F16J 15/022 123/41.72 |
| 4,770,133 A | * | 9/1988 | Schibalsky | F02F 1/16 123/193.2 |
| 4,817,578 A | | 4/1989 | Ushio et al. | |
| 4,848,292 A | * | 7/1989 | Holtzberg | F02F 7/0085 123/193.3 |
| 5,083,537 A | * | 1/1992 | Onofrio | F02F 1/108 123/195 C |
| 5,370,087 A | * | 12/1994 | Guimond | F02F 7/0012 123/195 R |
| 5,769,046 A | | 6/1998 | Ransone | |
| 5,884,550 A | * | 3/1999 | Northam | F16J 1/003 92/212 |
| 6,076,971 A | * | 6/2000 | Warwick | F02F 7/0053 384/433 |

(Continued)

OTHER PUBLICATIONS

Planet Minis, "Kix 140 Crank Stroking and Big Boring," online discussion forum, last accessed Apr. 6, 2016, 13 pages, http://planetminis.com/forums/bigger-minis-forum/209810-klx-140-crank . . . .

(Continued)

*Primary Examiner* — Marguerite McMahon
(74) *Attorney, Agent, or Firm* — Julia Voutyras; Price Heneveld LLP (57) ABSTRACT

A combustion engine is provided that includes an engine block with a fiber material in a resin. The engine block defines a piston bore and a bore liner positioned within the piston bore and includes a substrate and a coating positioned on an interior surface of the substrate. An exterior surface of the substrate defines a retention feature.

20 Claims, 5 Drawing Sheets

(56) References Cited

U.S. PATENT DOCUMENTS

| | | | |
|---|---|---|---|
| 6,138,630 A * | 10/2000 | Lazcano-Navarro | F02F 1/16 123/193.2 |
| 2005/0214540 A1 * | 9/2005 | Maslar | C23C 14/06 428/408 |
| 2005/0260436 A1 * | 11/2005 | Einberger | C23C 4/06 428/655 |
| 2008/0017160 A1 * | 1/2008 | Yamamura | F02F 1/20 123/193.2 |
| 2013/0133608 A1 | 5/2013 | Vilhelmsson et al. | |
| 2014/0190445 A1 * | 7/2014 | Reese | F02F 7/0073 123/198 E |

OTHER PUBLICATIONS

The Carbon Fiber Journal, "Carbon Fiber Engine Block," online product announcement, last accessed Apr. 6, 2016, 3 pages, http://www.thecarbonfiberjournal.com?p=770.

* cited by examiner

COMPOSITE COMBUSTION ENGINE

FIELD OF THE INVENTION

The present disclosure generally relates to internal combustion engine designs, and more particularly relates to a composite engine block design and method for making the same.

BACKGROUND OF THE INVENTION

It is becoming more common for vehicles to utilize lightweight components and designs in order to decrease vehicle weight in vehicle engines. However, strength and heat concerns must be addressed in order to maintain emissions standards and performance requirements. Accordingly, new designs of combustion engines and their components are desired.

SUMMARY OF THE INVENTION

According to one aspect of the present disclosure, a combustion engine is provided that includes an engine block with a fiber material in a resin. The engine block defines a piston bore and a bore liner positioned within the piston bore and includes a substrate and a coating positioned on an interior surface of the substrate. An exterior surface of the substrate defines a retention feature.

According to another aspect of the present disclosure, a combustion engine is provided that includes an engine block substantially comprising a fiber material within a resin. The engine block defines a deck face and a plurality of piston bores and a bulk head. The bulk head is positioned on an opposite side of the piston bores than the deck face and a plurality of reinforcement inserts is positioned in at least one of the deck face and the bulk head. The inserts are substantially surrounded by the fiber material in the resin.

According to a further aspect of the present disclosure, a method of forming a combustion engine is provided that includes providing a mold for forming an engine block, positioning a plurality of reinforcement inserts within the mold, and positioning a bore liner within the mold where the bore liner defines a plurality of retaining features, and injecting a fiber material and a resin into the mold. The fiber material and the resin substantially surround the reinforcement inserts and solidify the resin to form an engine block.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows, and will be apparent to those skilled in the art from the description, or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIGS. 1-4, reference numeral 10 generally designates an internal combustion engine having an engine block 14. The engine block 14 includes a fiber material 18 in a resin 22. The engine block 14 defines one or more piston bores 26. Each piston bore 26 is configured to receive a piston (not shown). A bore liner 30 is positioned within each piston bore 26. The bore liner 30 includes a substrate 34 and a coating 38 positioned on an interior surface 42 of the substrate 34. An exterior surface 46 of the substrate 34 defines multiple retention features 50. A plurality of reinforcement inserts 54 are positioned within the engine block 14 and substantially surrounded by the fiber material 18 and resin 22.

The combustion engine 10 may be used in a vehicle (e.g., car, truck, utility vehicle, etc.), motorcycles, aircraft, boat, construction equipment, farm equipment, industrial equipment (e.g., pumps, compressors, or generators). The engine block 14 of the combustion engine 10 defines one or more piston bores 26. In the depicted example, the engine block 14 defines four piston bores 26, but may define, two, three, or six piston bores 26 commonly referred to as an I-6 or Inline 6, (a V-engine configuration could utilize up to twelve cylinders) depending on the use of the engine block 14. The piston bores 26 are sized and configured to allow the translational movement of pistons in substantially upward and downward directions due to the combustion of fuel (e.g., gasoline or diesel). The substantially upward and downward motion of the pistons within the piston bores 26 may then be converted to rotational movement by driving a crankshaft which may propel the vehicle or equipment the combustion engine 10 is positioned in. In addition to the piston bores 26, the engine block 14 may further define a deck face 60 positioned at a top of the engine block 14. The deck face 60 may extend around the piston bores 26 and provide a location for a cam assembly to be attached or to rest. Further, the engine block 14 may also define a plurality of bulk heads 64. The bulk heads 64 may be positioned below the piston bores 26 and configured to support a load and stresses generated by the combustion process and the conversion of the linear movement of the connecting rods and pistons to rotational movement of the crankshaft.

As explained above, the engine block 14 may be formed of the fiber material 18 and the resin 22. The engine block 14 may be partially, substantially (e.g., more than 50%), or fully formed by the fiber material 18 and the resin 22. In a specific example, the engine block 14 may be formed via injection molding by injecting a mixture of the fiber material 18 and the resin 22 into a mold, as explained in greater detail below. The fiber material 18 within the resin 22 may have a fiber volume fraction in the engine block 14 of between about 1% and about 60%, or between 5% and about 50%, or between about 15% and about 45%, or between about 30% to about 40%. In some embodiments, the fiber volume fraction may be between about 5%-15%. The fiber volume fraction of the fiber material 18 may be substantially uniform throughout the engine block 14, or may vary through different locations of the engine block 14. For example, areas of the engine block 14 that are anticipated to encounter high stresses may be configured to incorporate higher fiber volume fractions of the fiber material 18 than areas not expected to experience high stresses.

In some embodiments, the fiber material 18 can be composed of materials including carbons (e.g., carbon fibers), aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses. The fiber material 18 may also incorporate more than one type of fiber. According to various embodiments, the fiber material 18 may be chopped. In some embodiments, the length of the chopped fibers of the fiber material 18 can be between about 3 mm and about 11 mm, or between about 5 mm and about 7 mm. Typically, the fibers of the fiber material 18 are randomly oriented in the resin 22, but they may also be substantially directionally aligned in areas of the engine block 14 subject to high directional stresses. The resin 22 employed in the engine block 14 can include a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole, or combinations thereof. In some embodiments, the resin 22 may include multiple resins.

According to some embodiments, the engine block 14 may incorporate one or more preformed fiber mats in addition to the fiber material 18 and the resin 22. The preformed fiber mats may include woven or non-woven fibers that are held together using the same or different resins as the resin 22. The mats may also incorporate fibers having different dimensions from the fibers employed in the engine block 14. Similarly, the fibers of the mats may be in either a continuous or chopped configuration. The fibers of the mats may also be composed of a material having the same or a different composition from that of the fibers employed in the fiber material 18 of the engine block 14. The mats may be incorporated in areas of the engine block 14.

Figure 1:
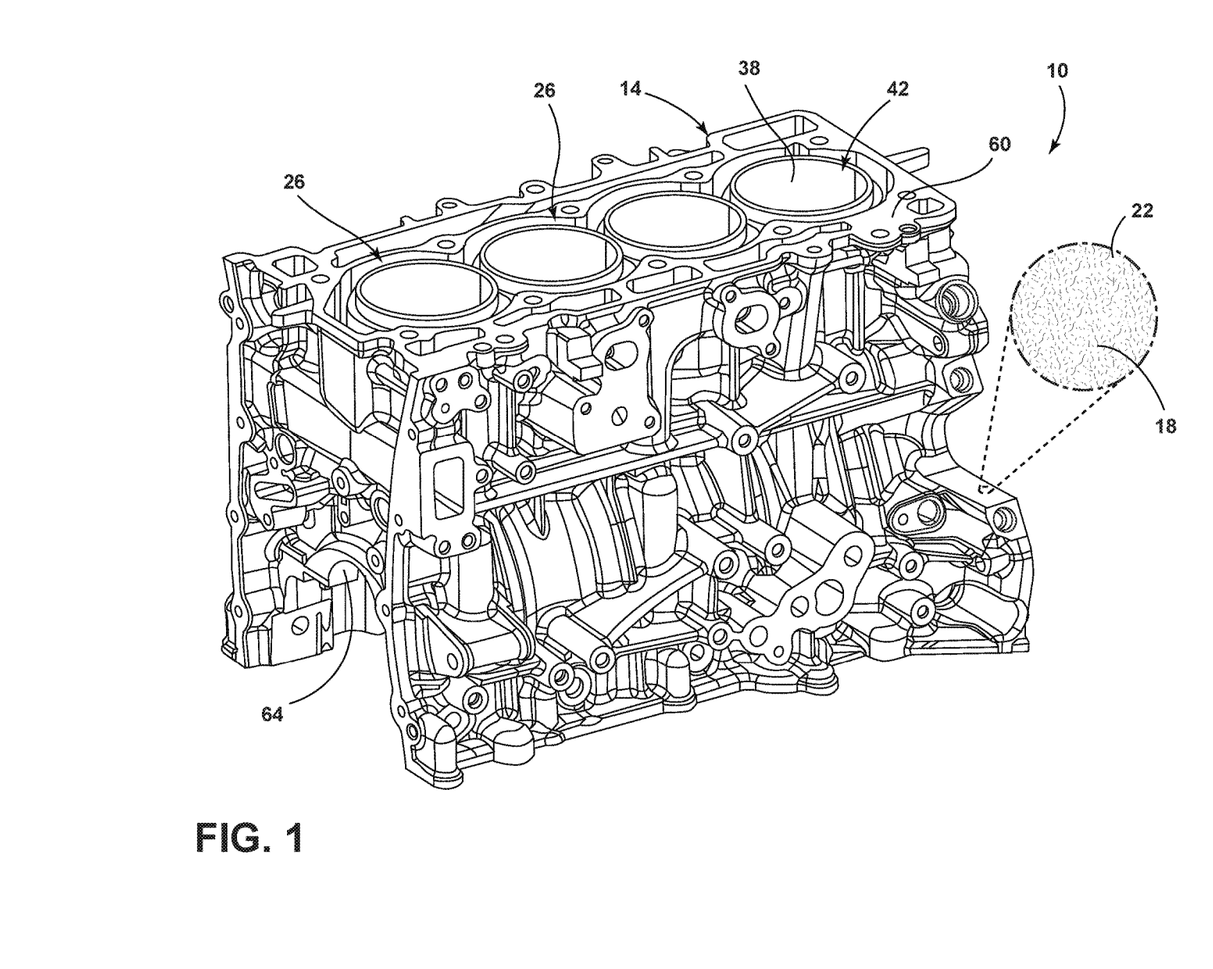
FIG. 1 is a front perspective view of an engine block of a combustion engine, according to one embodiment.
Figure 2:
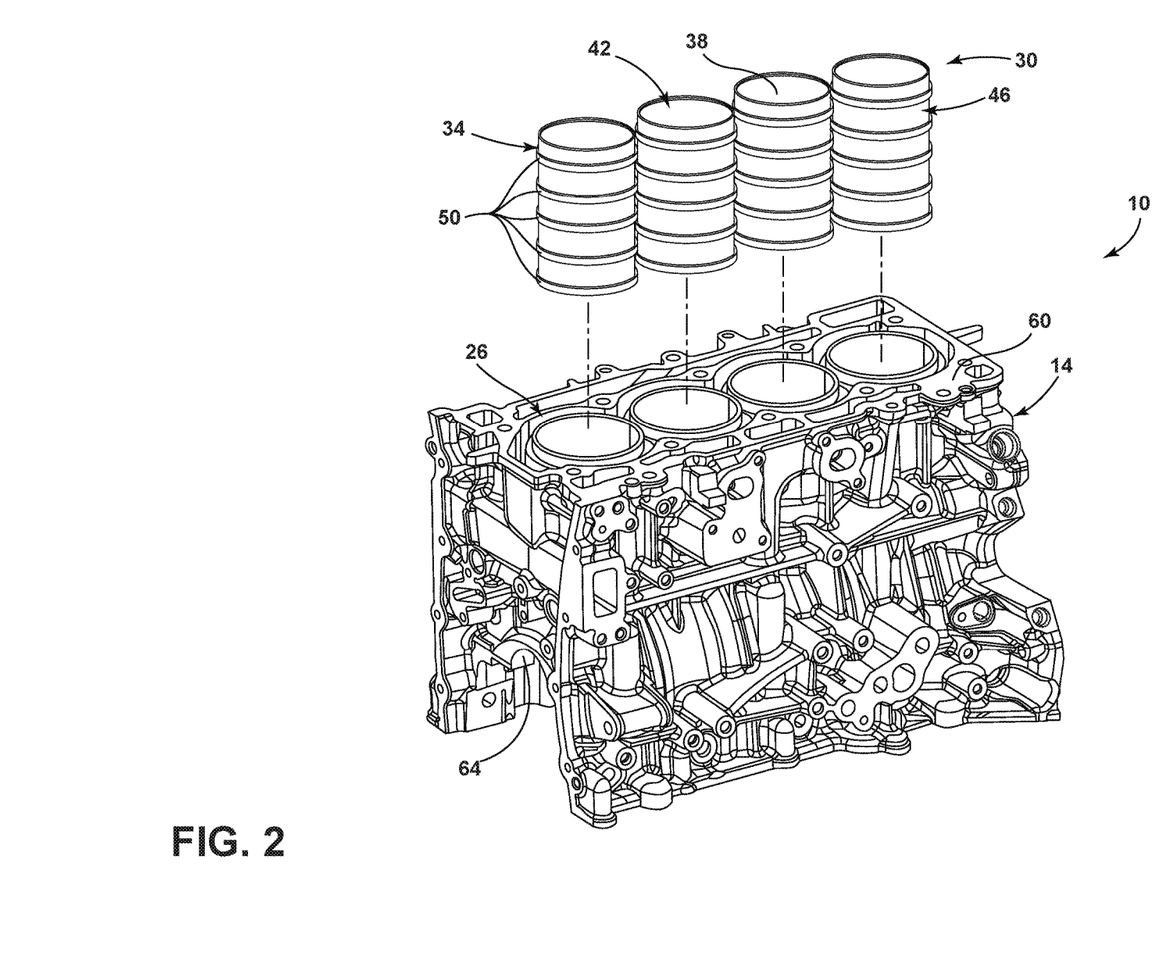
FIG. 2 is an exploded front perspective view of the engine block of FIG. 1, according to one embodiment.
Figure 3:
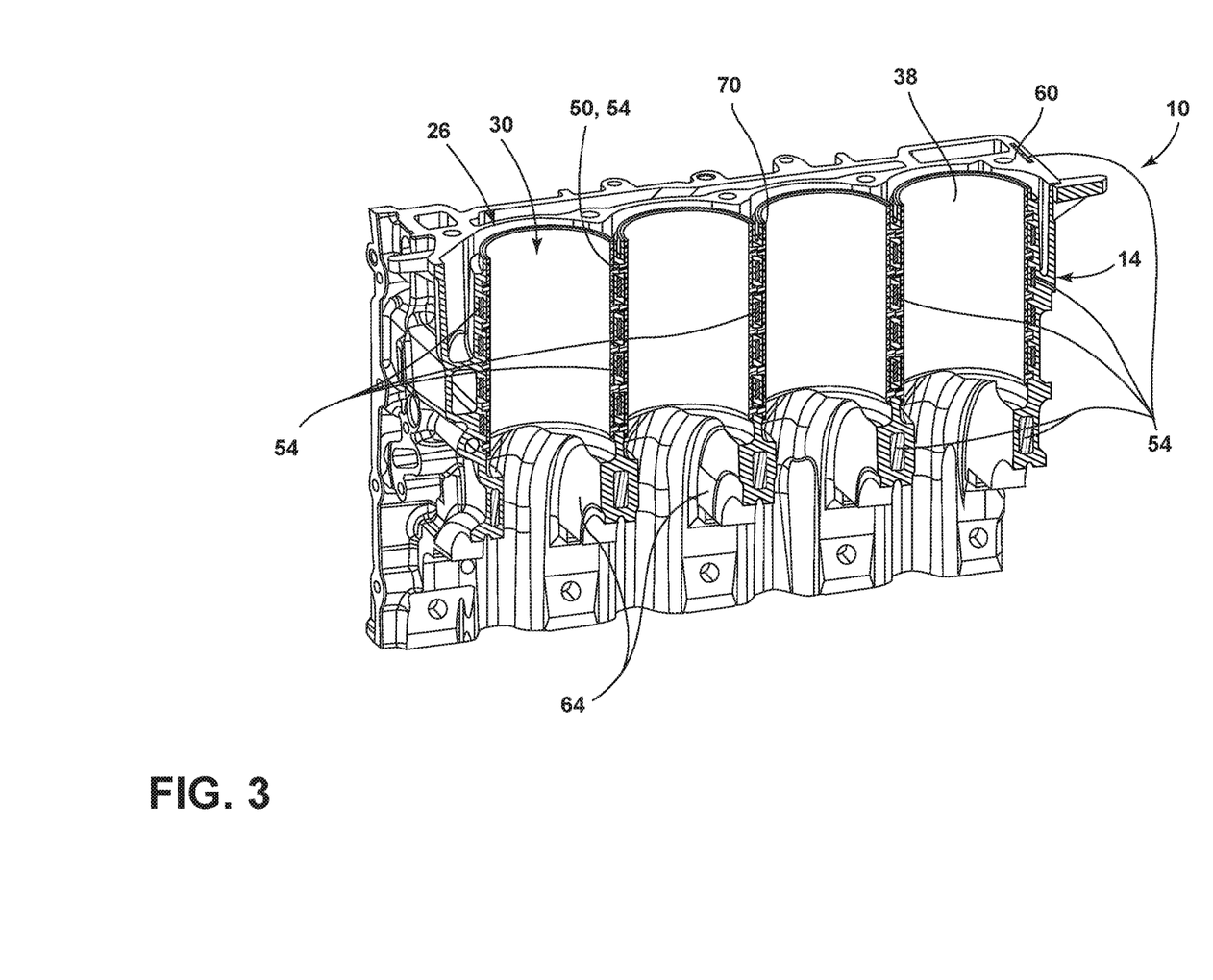
FIG. 3 is a cut away view of the engine block of FIG. 1, according to one embodiment.

Referring now to FIGS. 2 and 3, positioned within the piston bores 26 are the bore liners 30. As explained above, the bore liners 30 include the substrate 34 which defines the interior surface 42 and the exterior surface 46. The substrate 34 may include a metal (e.g., iron, aluminum, steel, magnesium, etc.), ceramic, or composite thereof. The exterior surface 46 of the bore liner 30 defines one or more retention features 50. The plurality of retention features 50 extend outwardly from the bore liner 30 into the engine block 14. The one or more retention features 50 are configured to retain the bore liner 30 in place and within the engine block 14 as the pistons move through the piston bores 26. In the depicted embodiment, each of the bore liners 30 define five retention features 50, but may define, one, two, three, four, six or more retention features 50. In the depicted embodiment, the retention features 50 are configured as a plurality of continuous ribs extending around a circumference of the exterior surface 46 of the substrate 34. It will be understood that, in rib embodiments of the retention features 50, the rib may be discontinuous or composed of a plurality of smaller sections or segments. The rib may also be one continuous helical feature. Further, it will be understood that the retention features 50 may take a variety of configurations such as points, hooks, lips, dovetails, edges and/or other structures configured to retain the relative position of the bore liner 30 and the engine block 14. Even further, it will be understood that each of the retention features 50 may have a different shape and/or different function (e.g., one retention feature 50 may be configured to resist rotational motion of the bore liner 30 while another retention feature 50 may be configured to prevent movement in an upward and downward direction within the piston bore 26) based on its shape and/or configuration. As depicted, the engine block 14 may define one or more walls 70 between each of the piston bores 26. In such an embodiment, the retention features 50 of the bore liners 30 may be configured to extend into the walls 70 and abut one another, as depicted, or may be configured to interlock while forming an intended passage to flow engine coolant from one side to the other. In yet other embodiments, the retention features 50 may be staggered relative to one another. In yet other embodiments, the retention features 50 of each of the bore liners 30 may be integrally formed such that the plurality of bore liners 30 is in fact one piece within the engine block 14.

Positioned on the interior surface 42 of the bore liner 30 is the coating 38. According to various embodiments, the coating 38 may be an anti-friction or anti-stick coating configured to allow pistons/rings to move through the piston bores 26 with minimal friction. According to various embodiments, the coating 38 may include a carbide. The coating 38 may include a nickel/silicon carbide, cadmium, silver, nickel, chrome, aluminum, titanium, a polymer or combinations thereof. The coating 38 may be applied via electrolysis, plasma coating, sputtering or other techniques known in the art.

Figure 4:
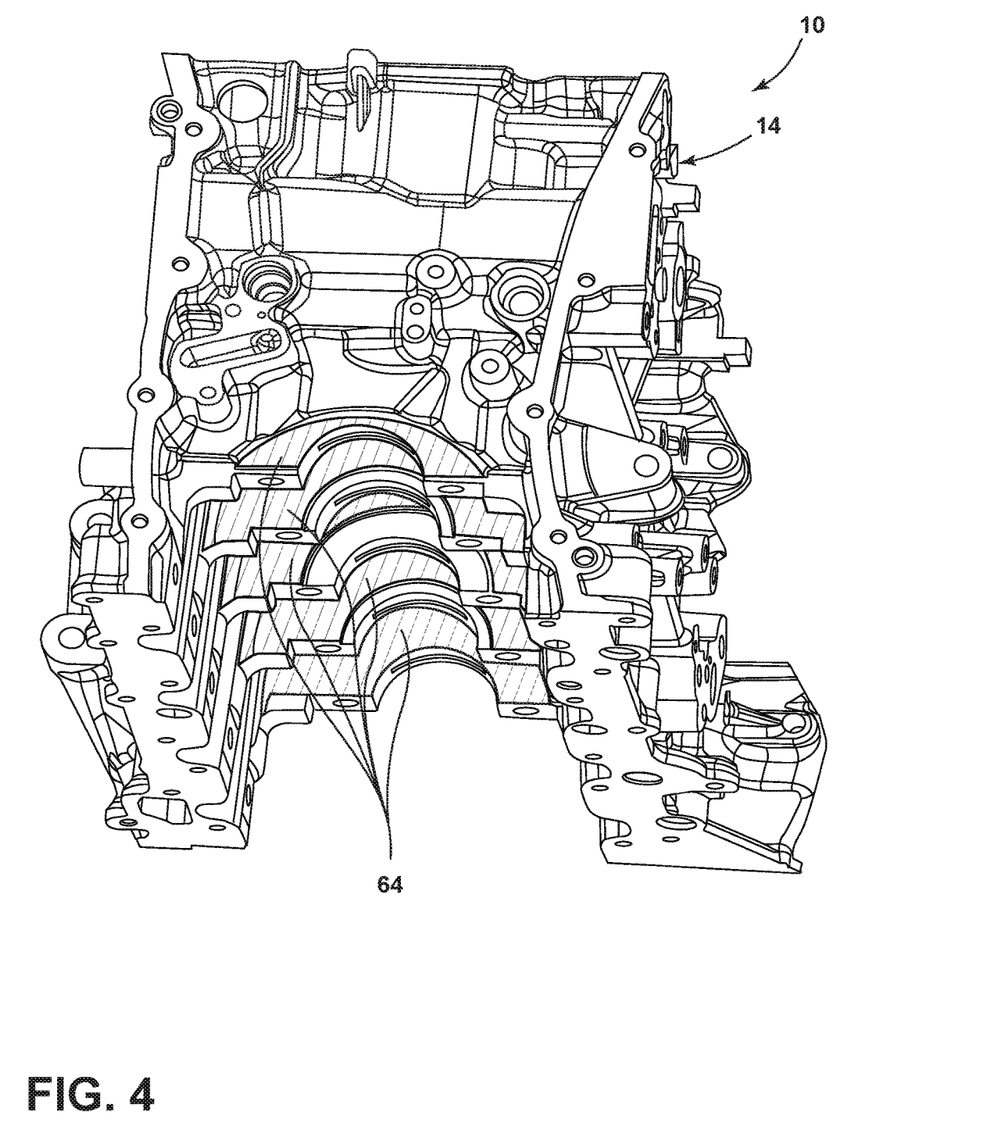
FIG. 4 is a bottom front perspective view of the engine block of FIG. 1, according to one embodiment.

Referring now to FIGS. 3 and 4, positioned in a variety of positions within the engine block 14 are the reinforcement inserts 54. The reinforcement inserts 54 may be positioned in the deck face 60, the bulk heads 64, the walls 70 and/or other locations within the engine block 14. The reinforcement inserts 54 may be configured to provide additional support or strength where applied in the engine block 14. The reinforcement inserts 54 may be partially (e.g., greater than about 1%, 10%, 20%, 30%, 40%, 45%, 49%), substantially (e.g., greater than about 50%, 60%, 70%, 80%, 90%, 99%) or fully covered by the fiber material 18 and the resin 22 of the engine block 14. The reinforcement inserts 54 may be composed of materials including carbons (e.g., carbon fibers), aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses. The reinforcement inserts 54 may be composed of chopped fiber and/or continuous fiber within or out of a resin. In embodiments where the reinforcement inserts 54 include an insert resin, the insert resin may be configured to be compatible with the resin 22 such that knit lines and defects at an interface between the resin 22 and the reinforcement inserts 54 are minimized.

Figure 5:
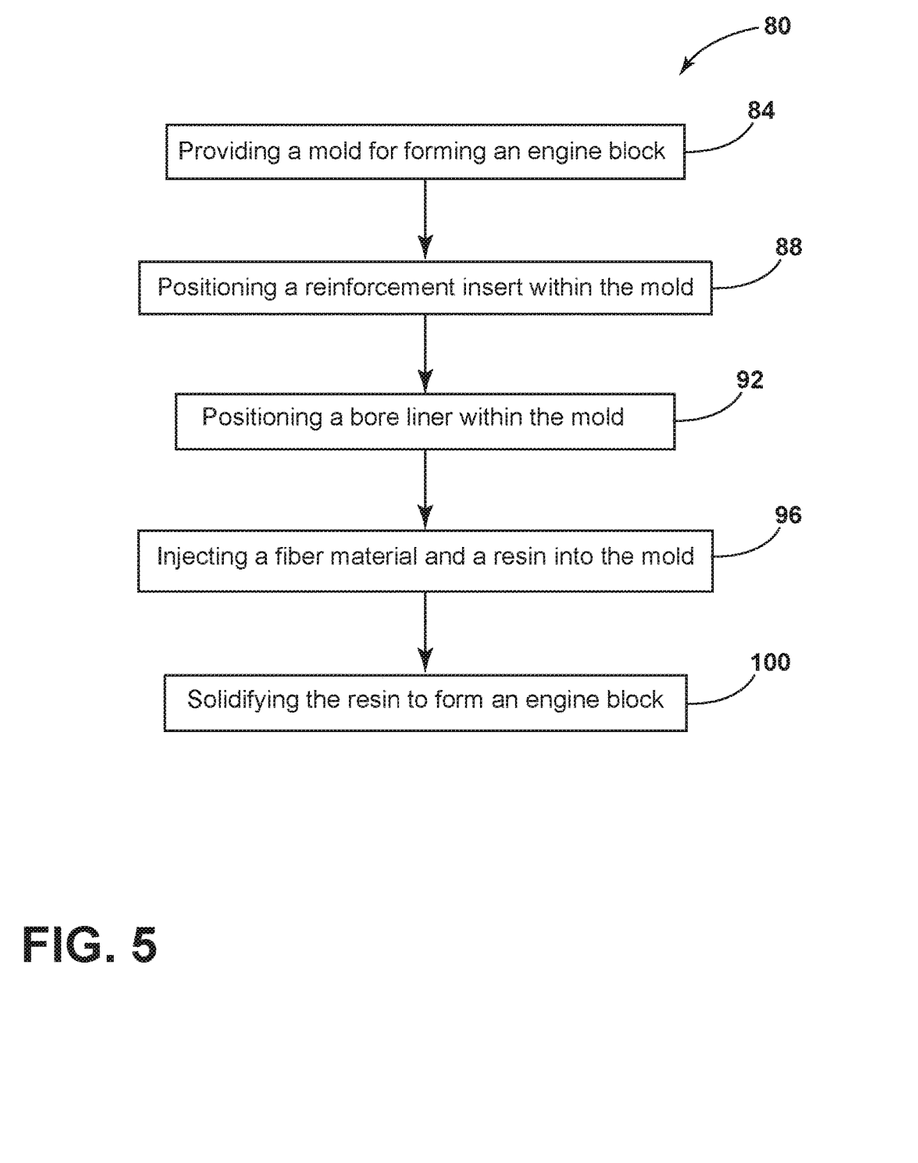
FIG. 5 is a schematic of a method for forming the engine block of FIG. 1 using an injection molding system, according to one embodiment.

Referring now to FIG. 5, depicted is a schematic embodiment of a method 80 for forming the engine block 14. The method 80 includes step 84, step 88, step 92, step 96 and step 100. The method 80 begins with step 84 of providing a mold for forming the engine block 14. The mold may include two or more plates configured to form a cavity in the shape of the engine block 14 or of sub-components thereof. It will be understood that the mold may be moveable and include features configured to accept, hold or otherwise restrain the bore liners 30 and/or the reinforcement inserts 54. Next, step 88 of positioning the plurality of reinforcement inserts 54 within the mold is performed. As mentioned above, the mold may be configured to secure the reinforcement inserts 54 in place. Next, step 92 of positioning the bore liners 30 within the mold is performed. Next, step 96 of injecting the fiber material 18 and a resin 22 into the mold is performed. Placement of the reinforcement inserts 54 and the bore liners 30 within the mold prior to injection of the mixture of the fiber material 18 and resin 22 allows the mixture to coat the reinforcement inserts 54 and the bore liners 30. The mixture of fiber material 18 and resin 22 may be heated prior to injection to ensure a sufficient viscosity is achieved. In some embodiments, a superheat may be applied to the mixture to ensure the mixture of fiber material 18 and resin 22 properly coat the reinforcement inserts 54 and the retention features 50. Finally, step 96 of solidifying the resin 22 to form an engine block 14 is performed.

Use of the engine block 14 as set forth in the present disclosure may offer a variety of advantages. First, use of the engine block 14 incorporating the fiber material 18 and the resin 22 may be lighter than traditional engine blocks composed of metal. Lighter engine blocks may allow for an increased fuel economy to be achieved with the vehicle, as well as a reduction in material costs due to the associated weight loss. Second, use of carbon fiber examples of the fiber material 18 may allow for the use of high strength materials which may not typically be found in engine blocks 14. For example, aramid fibers (e.g., Kevlar) may not typically be used in conventional metal engine blocks due to the high heat conduction of the metal and high heat generation from the burning of fuel. However, by partially, substantially, or fully covering the reinforcement inserts 54, heat conduction to the reinforcement inserts 54 may be reduced such that the reinforcement inserts 54 retain their mechanical properties. Lower heat conduction materials within the engine block 14 allow for higher temperatures to be realized which may reduce emissions. Third, use of the coating 38 provides a smooth and low friction coating to the bore liners 30 to provide a low friction running surface of the pistons and rings. Fourth, use of the retention features 50 allows for the retention of the bore liners 30 within the engine block 14 such that the liners 30 are retained in place during formation and use of the engine block 14. Fifth, use of the reinforcement inserts 54 allow for the reinforcing of various locations within the engine block 14 without the need to use higher strength and heavier materials everywhere which may result in a weight savings and/or fuel efficiency. Sixth, use of the insertable bore liners 30 and reinforcement inserts 54 in conjunction with the injection molded engine block 14 may allow for complex machining and manufacturing steps to be skipped due to the integrally formed nature of the combustion engine 10.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below are incorporated into and constitute part of this Detailed Description.

What is claimed is:

1. A combustion engine, comprising:
   an engine block comprising a fiber material in a resin, the engine block defining a wall between adjacent piston bores;
   one or more reinforcement inserts positioned within the wall between adjacent piston bores, wherein the one or more reinforcement inserts are coated with the fiber material and the resin such that the one or more reinforcement inserts are substantially surrounded by the fiber material and the resin; and
   a bore liner positioned within each piston bore, wherein each of the bore liners comprises a substrate having an interior surface on which a coating is positioned and an exterior surface defining a retention feature that extends into the wall between adjacent piston bores.

2. The combustion engine of claim 1, wherein the one or more reinforcement inserts are coated with the fiber material and the resin such that the one or more reinforcement inserts are fully surrounded by the fiber material and the resin.

3. The combustion engine of claim 2, wherein the substrate comprises aluminum.

4. The combustion engine of claim 1, wherein at least one of the bore liners defines a plurality of retention features extending outwardly from the bore liner into the engine block.

5. The combustion engine of claim 4, wherein the retention features comprise a plurality of ribs.

6. The combustion engine of claim 1, wherein the coating of the piston bores comprises a carbide.

7. A combustion engine, comprising:
   an engine block substantially comprising a fiber material within a resin, the engine block defining a deck face, a plurality of piston bores, one or more walls between the piston bores, and a bulk head; and
   a plurality of reinforcement inserts positioned in the one or more walls between the piston bores, wherein the inserts are substantially surrounded by the fiber material in the resin.

8. The combustion engine of claim 7, wherein the reinforcement inserts comprise an aramid fiber.

9. The combustion engine of claim 7, wherein the reinforcement inserts are positioned between the plurality of piston bores.

10. The combustion engine of claim 7, wherein the reinforcement inserts are fully surrounded by the fiber material and the resin.

11. The combustion engine of claim 7, further comprising:
    a plurality of bore liners positioned within the plurality of piston bores.

12. The combustion engine of claim 11, wherein each of the plurality of bore liners define a plurality of ribs substantially surrounded by the fiber material and the resin of the engine block.

13. The combustion engine of claim 12, wherein the bore liners comprise aluminum.

14. A method of forming a combustion engine, comprising:
    providing a mold for forming an engine block;
    positioning a plurality of bore liners that each define a retention feature within the mold;
    positioning one or more reinforcement inserts within the mold between adjacent bore liners;
    injecting a fiber material and a resin into the mold, wherein the fiber material and the resin substantially surround the reinforcement inserts; and
    solidifying the resin to form the engine block.

15. The method of claim 14, wherein at least one of the plurality of bore liners comprises a metal substrate and a ceramic coating within at least one of the plurality of bore liners.

16. The method of claim 14, wherein the retention features extend between the bore liners into the fiber material and the resin.

17. The method of claim 14, wherein the fiber material and the resin fully surround the reinforcement inserts.

18. The method of claim 14, wherein the reinforcement inserts are positioned in both a deck face and a bulk head of the engine block.

19. The method of claim 14, wherein the reinforcement inserts comprise an aramid fiber.

20. The method of claim 19, wherein the fiber material comprises a carbon fiber material.

* * * * *